United States Patent [19]

Fowler et al.

[11] 4,135,545

[45] Jan. 23, 1979

[54] BALL VALVE SEAT ASSEMBLY HAVING A SWAGED SEAT RING TO RETAIN THE FACE SEAL

[75] Inventors: James M. Fowler, Missouri City; George A. Moran, Houston, both of Tex.

[73] Assignee: ACF Industries, Incorporated, New York, N.Y.

[21] Appl. No.: 822,104

[22] Filed: Aug. 5, 1977

[51] Int. Cl.² .............................................. F16K 3/36
[52] U.S. Cl. ............................ 137/246.22; 137/315; 251/174; 251/315; 251/317
[58] Field of Search ............... 251/316, 315, 317, 174; 137/246.22, 315

[56] References Cited

U.S. PATENT DOCUMENTS

| | | | |
|---|---|---|---|
| 2,963,260 | 12/1960 | Siravo | 251/315X |
| 3,219,055 | 11/1965 | Dumm | 251/174 X |
| 3,275,025 | 9/1966 | Kowalski | 251/315 X |

*Primary Examiner*—Harold W. Weakley
*Attorney, Agent, or Firm*—Eugene N. Riddle

[57] ABSTRACT

A ball valve seat assembly includes a seat ring for mounting in a ball valve seat pocket and an annular face seal mounts on one end of the seat ring. The resilient annular face seal member is mounted in a groove in the seat member with one end portion exposed to seal against a ball valve member. The annular seal member has an enlarged end portion located in the closed end of the annular groove. An inner wall portion of the seat ring is permanently deformed radially outwardly over the enlarged portion of the seal ring to anchor it in place in the seat ring. Deforming of the inner wall portion is done by swaging the seat ring.

1 Claim, 5 Drawing Figures

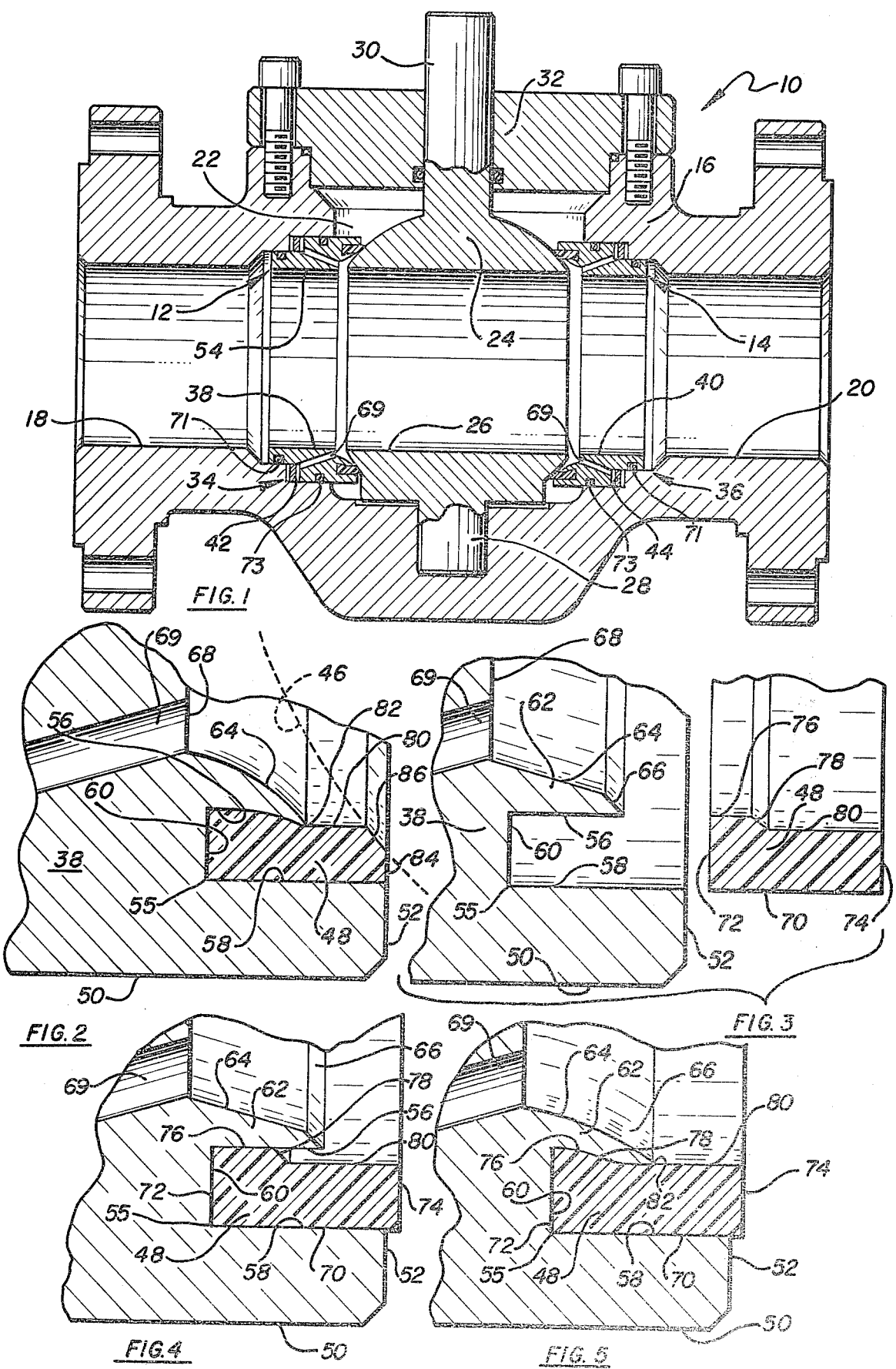

BALL VALVE SEAT ASSEMBLY HAVING A SWAGED SEAT RING TO RETAIN THE FACE SEAL

BACKGROUND OF THE INVENTION

This invention is related to ball valve seat assemblies which have an annular seat ring member mounted in an annular groove around the flow passageway in a ball valve. Further, this invention is related to ball valve seat assemblies which employ a metallic seat ring member that carries an annular non-metallic seal member on one side thereof to contact the valve member.

In the prior art several general types of seat constructions are known which utilize a metal seat ring member to mount a non-metallic seal member. In the simplest of these constructions a cross-sectionally rectangular non-metallic seal ring is simply pressed into a cross-sectionally rectangular groove in the face of a seat ring member and retained in place due to compression of the non-metallic seal member. This construction has several major disadvantages, one of which is the difficulty in sizing the seal member and the grooves so the proper interference is provided. Another disadvantage is that this type of seal construction will sometimes blow out when the valve is opened or closed during a high velocity flow rate condition due to the seal member slipping on the sides of the groove.

Another construction for holding a non-metallic seal member in a metallic annular seat ring is to sandwich the seal member between two separate parts of a seat ring as shown in U.S. Pat. No. 3,416,558 issued Dec. 17, 1968 to M. T. Works. This construction provides for holding of the non-metallic seal member, however, it is expensive and difficult to manufacture as well as complicating the structure by requiring welding of the seat ring to secure the separate members.

Another seat construction utilizes an annular groove in the seat member with a wall of uniform thickness on one side of the groove being deformed by spinning to a position which overlies the side and a face end portion of the non-metallic seal member, thus holding it in place. This construction is shown in U.S. Pat. No. 3,827,673 issued Aug. 6, 1974 to R. C. Houlgrave et al. Another seat construction which apparently uses a heated non-metallic seal member that is pressed into a preformed groove in the seal member as shown in U.S. Pat. No. 3,729,015 issued Apr. 24, 1973 to J. P. Oliver. While this construction may serve to secure the non-metallic seal member, it utilizes a grooved construction which is extremely difficult to machine due to its intricate shape. Assembly of this seat is believed to require the heating and compression of the non-metallic material to force it into the groove.

SUMMARY OF THE INVENTION

In an embodiment the valve seat assembly includes an annular metal seat ring member that is adapted to be longitudinally movably mounted in a seat pocket of a valve. The seat ring member has an annular groove around its front face which opens toward the valve member when the seat ring member is installed in a valve. The seat member has a permanently deformable inner wall portion which forms one side of the groove and which is bent by a swaging operation toward the opposite wall of the groove. The non-metallic seal member which is mounted in the groove has an enlarged portion on one side thereof which rests in the closed end portion of the groove and which is retained by the deformed inner wall portion of the seat member.

One object of this invention is to provide a valve seat assembly overcoming the aforementioned disadvantages of the prior art devices by providing a non-metallic seal for a valve seat assembly which has a substantial resistance to being blown out during high velocity flow rate conditions and yet which can be easily manufactured.

Another object of this invention is to provide a valve seat assembly which can be manufactured without difficulty in a consistent mass produced manufacturing operation by swaging of the metallic seat member to lock the non-metallic seal member in place.

Various other objects, advantages, and features of this invention will become apparent to those skilled in the art from the following discussion, taken in conjunction with the accompanying drawings, in which:

DESCRIPTION OF THE DRAWINGS

FIG. 1 is a cutaway elevation view of a trunnion style ball valve employing the seat construction of this invention;

FIG. 2 is an enlarged cross-sectional view of a portion of a valve seat removed from the valve shown in FIG. 1;

FIG. 3 is an enlarged exploded cross-sectional view of a portion of the valve seat member and annular seal member for the valve seat shown in FIG. 1 in a preassembled condition with the seal member shown displaced from and in axial alignment with the seat member groove and the seat member being shown in its original condition before the deformable wall portion is swaged;

FIG. 4 is an enlarged cross-sectional view of a portion of the valve seat member shown in FIG. 3 with the seal ring in place in the groove in the position assumed prior to swaging of the seat member; and FIG. 5 is an enlarged cross-sectional elevation view of a portion of the valve seat member shown in FIG. 4 after swaging of the seat member and before the face portion of the seal is formed to its final finished shape.

The following is a discussion and description of a preferred specific embodiment of the valve seat assembly of this invention, such being made with reference to the drawing whereupon the same reference numerals are used to indicate the same or similar parts and/or structure.

DETAILED DESCRIPTION OF THE DRAWING

Referring to FIG. 1 of the drawing, a trunnion style ball valve indicated generally at 10 is shown equipped with a pair of identical seat assemblies 12 and 14 of this invention. Valve 10 is representative of one type of ball valve which can utilize the seat assembly of this invention and this style of valve is shown for the purpose of illustrating use of the seat assembly. Ball valve 10 includes a valve body 16 with respective inlet and outlet flow passageways 18 and 20 communicating with a valve chamber 22 in the body. A ball valve member 24 having a passageway 26 therethrough is rotatably mounted in valve chamber 22 for movement between open and closed positions relative to the flow passageways 18 and 20. Ball valve member 24 is supported on the bottom by a trunnion shaft 28 which is rotatably mounted in valve body 16 an on the top by a stem 30 which is rotatably mounted through a bonnet or top cover 32. Seat assemblies 12 and 14 are mounted in annular seat pockets 34 and 36 respectively formed in the wall of flow passageways 18 and 20 at their respective junctures with valve chamber 22. Seat assemblies 12 and 14 include annular seat ring members 38 and 40 and associated spring assemblies 42 and 44.

FIGS. 2 through 5 inclusive show a portion of a seat ring member in the completed condition and in various stages of construction thereof. For convenience in making a comparison to FIG. 1, seat member 38 is shown in FIGS. 2 through 5. Seat member 38 is longitudinally elongated about the central axis of the flow passageways and for purposes of this discussion can be considered as having a face portion which mounts the seal ring and a rear portion which extends into the seat pocket and contacts the associated spring 42. FIG. 2 shows the face portion of seat member 38 in a finished and ready for use condition. The dashed line in FIG. 2 illustrates the spherical outer surface 46 of ball valve member 24. It is to be noted that seat member 38 is preferably constructed of a metallic material and seal ring member 48 forming the face seal is constructed of a non-metallic material such as a plastic.

FIG. 3 shows the face portion of seat ring member 38 and the seal ring member 48 in their original unassembled shapes to which they are manufactured prior to assembly of the seat assembly. Seat member 38 is formed with a substantially cylindrical outer surface 50, a transverse and substantially planar face 52, an internal bore 54 and a rear portion. A groove 55 is formed in face 52 around the end thereof to mount the seal member. Groove 55 is formed with essentially parallel inner and outer side surfaces 56 and 58 and a transverse bottom 60. Groove inner surface 56 is on one side of a permanently deformable lip or inner wall portion 62 of seat member 38. Deformable lip 62 includes an inner side 64 adjoining the flow passageway, an outer side which forms groove inner surface 56, and a free end 66. Free end 66 terminates at an apex or point 82 on the end of inner surface 56 and is inclined around 45° with respect to the longitudinal axis of bore 54. Free end 66 is spaced between groove bottom 60 and seat end surface 52. Lip inner side 64 extends generally in the direction of seat end surface 52 and tapers outwardly relative to the axis of seat bore 54 from an annular abutment or shoulder 68 that extends in a direction transverse to seat bore 54. The inner perimeter of abutment 68 adjoins seat bore 54 and the outer perimeter of abutment 68 joins side 64.

An aperture 69 extends from abutment 68 outwardly to join the seat outer peripheral surface at a mid-portion of the seat member. As shown in FIG. 1 an O-ring 71 is provided in a groove around seat outer surface 50 and another O-ring 73 is mounted in a groove around the seat outer surface at the opposite end of seat member 38. Aperture 69 provides fluid communication to the volume between O-rings 71 and 73 in which spring assembly 42 is positioned.

FIG. 3 shows non-metallic seat member 48 in the original or precut form. Seal ring member 48 is a somewhat cylindrically shaped and axially elongated member with an enlarged base end portion. The enlarged base portion of seal ring member 48 is positioned in the bottom or closed end of groove 55. Seal ring member 48 has a substantially cylindrical outer surface 70 which joins a transversely disposed outer end 72 and a transversely disposed inner end or face 74.

The interior of seal ring member 48 has a small diameter portion 76 joining outer end 72 and extending to a mid-portion of the seal ring member. In the mid-portion of the seal ring interior an inclined or tapered portion 78 joins small diameter portion 76 and a larger diameter inner portion 80. Larger diameter portion 80 extends from tapered portion 78 to inner end or face 74. Small diameter portion 76, larger diameter portion 80 and outer surface 70 are essentially parallel to each other. Outer surface 70 is sized to slip inside groove outer surface 58 with the small diameter portion 76 of seal member 48 being in contact with inner surface 56. Groove inner side 56 is sufficiently long to extend past inclined portion 78 and over a portion of larger diameter surface 80 when seal ring 48 is placed in the groove as shown in FIG. 3.

FIG. 4 shows seal ring member 48 in groove 55 in the location it must be placed prior to swaging of the seat member. In this position groove bottom 60 is in flush contact with seal member outer end 72 and the free end of groove inner side 56 is positioned well over a mid-portion of seal larger diameter surface 80 while seal small diameter surface 76 is in contact with or closely adjacent to groove inner side 56. It is to be noted that seal face 74 extends beyond seat end surface 52. After inner wall 62 is swaged to retain seal member 48 then the seal member face can be shaped as desired to contact outer surface 46 of ball valve member 24.

FIG. 5 shows seat member 38 and seal member 48 after inner wall portion 62 has been swaged. The swaging of the seat member and particularly inner wall 62 is done by supporting the seat member on a rigid surface and inserting a swaging tool into the interior of the seat bore to contact wall inner side 64 and deform it radially outwardly to the position shown in FIG. 5. This swaging tool must necessarily have a blunt exterior surface so that inner wall 62 is displaced uniformly outward as the tool is moved into the seat member. In the swaged or permanently deformed position inner wall portion 62 is deformed so that groove side 56 is pressed into contact with the several inner side portions of seal member 48 and the tip 82 of inner wall 62 is indented or impressed into surface 80. Inner wall 62 tapers radially outwardly relative to the flow passageway of seat member 38 from its root portion to tip 82. Groove inner side 56 extends over surface 76 and tapers smoothly radially outwardly over inclined surface 78 and over a portion of surface 80. The portion of larger diameter surface 80 that is touched by inner wall 62 and portions of the surface adjacent thereto are indented or deformed slightly as shown in FIG. 5. Preferably inner wall 62 is swaged sufficiently to be deflected to the approximate position shown in FIG. 5 so that groove inner side 56 rests in flush surface-to-surface contact with the inner side portions of seal member 48 and to some extent compresses that portion of the seal member. By deforming inner wall 62 to this position it effectively holds or locks seal member 48 in place in the groove because the enlarged portion of seal member 38 is then retained or anchored by inner wall 62.

In considering the swaging of seat inner wall 62 and its effect on seal member 48, it is important to note that inner wall 62 is deformed sufficiently to retain seal member 48 but not so much that tip 82 excessively digs into or otherwise damages seal member 38. Because inner wall 62 is tapered and the thickest portion of seal member 48 is adjacent the thicker portion of inner wall 62, this causes inner wall 62 to bend smoothly over the enlarged portion and the tapered portion of the seal member during the swaging operation. In its final deformed position inner wall 62 has tip 82 thereof impressed slightly into seal member inside surface.

After seat member 38 and seal member 48 are swaged together as shown in FIG. 5, then the sealing face portion of seal member 48 is shaped to its final form as shown in FIG. 2. The finished or final face end of seal member 48 has an outer end portion 84 that is approximately aligned with seat end surface 52 and an inclined face 86 that connects end portion 84 and larger diameter surface 80. Inclined face 86 is shaped to contact exterior surface 46 of ball valve member 24 in a fluid-tight sealing contact.

It is to be understood that the novel seat construction of this invention can be used in a gate valve as well as the ball valve described above. In using the seat construction in a gate valve the seat face portion would be constructed as shown in FIG. 5 with seal surface 74 extending beyond seat end surface 52 so it can contact one side of a gate valve member. The advantages of seal retention and resistance to damage by a high flow rate are the same for the seat construction whether it is in a gate valve or a ball valve.

It is apparent from the foregoing that the unique valve seal assembly construction of this invention provides a seat assembly which is easily manufactured and will withstand severe service conditions. Because of the unique and novel swaged construction, the seat assembly of this invention retains the seal member in a locked in place condition. Also, this unique construction because of its seal retaining features provides a valve seat assembly that will not be immediately damaged by high flow rate conditions.

What is claimed is:

1. In a valve having a valve body with inlet and outlet passageways connected by a valve chamber with a valve member mounted in the valve chamber and movable between open and closed positions, and an annular seat pocket around one of said passageways and opening to said valve chamber, an improved valve seat assembly comprising:
   (a) a metal seat ring mounted in said seat pocket for movement in a direction longitudinally of the passageways, said seat ring having an annular groove facing said valve member and a deformable inner wall defining the smaller diameter side of said annular groove, said annular groove prior to deformation of said inner wall having generally parallel sides;
   (b) said deformable inner wall prior to deformation having a relatively thick root portion, a relatively thin lip portion, and a relatively short tapered inner side connecting said root portion and said lip portion, said deformable inner wall terminating at a relatively sharp point formed at the free end of the thin lip portion;
   (c) an annular resilient seal ring having an outer circumference of a uniform diameter mounted in said groove and retained by said deformable wall, said seal ring having a front face inclined relative to said outer circumference to establish line sealing contact with said valve member, an outer end in contact with the bottom of said groove, and an enlarged thickness rear end portion adjacent said outer end fitting within a bottom portion of said groove;
   (d) said deformable inner wall having a small diameter portion adjacent said enlarged thickness rear end portion, and a large diameter portion joining said face with said small and large diameter portions connected by a tapered portion located along a mid-portion of said deformable wall;
   (e) said deformable wall being permanently deformed outwardly over said seal ring enlarged portion to grip and anchor said seal ring in said groove such that said groove small diameter side contacts and substantially conforms to the shape of said enlarged portion and said tapered portion with said lip portion being impressed slightly into said large diameter portion of said seal ring, the small diameter side of said groove being deformed from its parallel relation to the large diameter groove side into a tapered portion adjacent the bottom of the groove with the thin lip portion defining a contiguous portion remaining in generally parallel relation to the large diameter groove side;
   (f) said seat ring having a front O-ring mounted in a groove around the outer perimeter thereof at the end portion thereof housing said seal ring, said seat ring having a reduced diameter portion on the rear end portion opposite said seal ring forming an outer abutment at the juncture with the large diameter portion having said seal ring;
   (g) said seat ring having a rear O-ring mounted in a groove around said reduced diameter portion, said seat ring having a lubricant passage therethrough extending from the interior thereof adjacent said seal ring to the outer perimeter thereof between said O-rings, said annular seat pocket having larger and reduced diameter portions joined by a seat pocket abutment extending between the larger and reduced diameter portions; and
   (h) spring means in said seat pocket between said seat outer abutment and said seat pocket abutment to bias said seat ring toward said valve member.

* * * * *